Figures 1, 2:
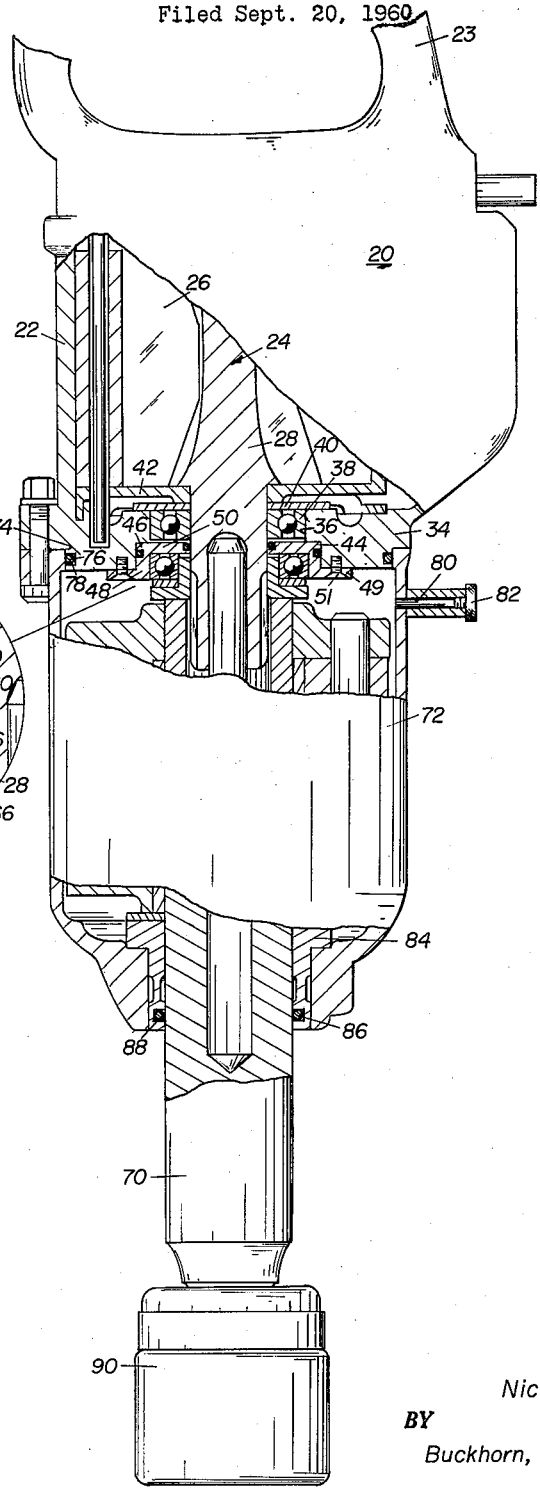

Aug. 20, 1963

N. ARCHITECT 3,101,139

IMPACT TOOL

Filed Sept. 20, 1960

INVENTOR.
Nicholas Architect
BY
Buckhorn, Cheatham & Blore
ATTORNEYS

United States Patent Office 3,101,139
Patented Aug. 20, 1963

3,101,139
IMPACT TOOL
Nicholas Architect, 5728 SE. 18th, Portland, Oreg.
Filed Sept. 20, 1960, Ser. No. 57,238
2 Claims. (Cl. 192—113)

The present invention relates to impact tools and more particularly to air actuated, reversible rotary tools adapted to apply a succession of rotational hammer blows to a driven member such as a nut or bolt.

The clutches with which the present invention are concerned comprise a reversible air motor which drives a clutch mechanism adapted to apply hammer blows to the driving end of the tool. The clutch mechanism is contained in a housing that in some instances is grease filled and in others is oil filled. The grease offers considerable resistance to the movement of the clutch parts reducing the energy output and in cold weather the stiffening of the grease may render the tool wholly inoperative. Oil filled clutches transmit power more efficiently and are not inclined to "freeze-up" in cold weather, but have given considerable difficulty heretofore because of the tendency of the seals between the motor housing and clutch housing to leak. The oil frequently leaks from the clutch to the motor which is not desirable but greater difficulty has been encountered in the fact that air leaks from the motor into the clutch housing. The pressure in the clutch housing may become so great as to cause the housing to crack or to blow the seals.

Accordingly, it is a principal object of the present invention to provide a new and improved sealing arrangement in wrenches of the type described.

More particularly, an object of the invention is to provide new and improved construction of an impact tool with improved sealing arrangements to permit the clutch housing to be filled with oil whereby the tool will be more efficient and will remain operative even in cold weather.

Still another object is to provide a sealing arrangement which will permit of ready modification of existing grease filled wrenches to permit the clutch housing of the same to be filled with oil.

Other objects and advantages of the invention will become more apparent in the following specification taken in conjunction with the drawing wherein:

FIG. 1 is a longitudinal sectional view of a rotary tool embodying the invention; and FIG. 2 is an enlarged view of an indicated portion of the tool showing certain details thereof.

Referring to the drawings the illustrated impact tool comprises a reversible air motor 20 contained within a generally cylindrical motor housing 22 having a handle 23 provided thereon. Rotatably mounted within the housing is a rotor 24 comprising a plurality of blades 26 and a shaft 28. Suitable means (not shown) are provided to pass air into the rotor chamber so as to drive the rotor in the desired direction of rotation. For a further discussion of suitable motor construction reference is made to U.S. Patent No. 2,077,733. The lower end of the motor housing 22 comprises an integral end wall 34 having an opening therein concentric with the shaft 28 and through which opening the shaft extends. The opening is defined by an upper portion 36 defining a race for a ball bearing 38 for supporting the shaft 28. Preferably a bearing seal 40 is positioned between the lower motor end plate 42 and the wall 34. The lower portion of the opening through the wall 34 is defined by a groove 44 defining an annular step about the bearing race 36. In a currently commercially available wrench having a grease filled clutch housing this groove serves as a seat for another ball bearing supporting the shaft 28. In accordance with the invention a cup-shaped bearing cage 46 having a tubular side wall portion 48 and an end wall portion 50 is seated in the groove 44. The side wall portion 48 may be provided with a flange 49 for receiving screws 51 threaded into the end wall 34 for securing the cage in place. The outer surface of the side wall portion 48 is provided with a groove 52 in which is seated an O-ring 54 which snugly engages the wall of the step 44 to form an oil tight seal between the cage and such wall.

The end wall 50 of the cage is formed with a concentric opening 56 through which the shaft 28 extends. The surface of the opening 56 is preferably formed with a groove 58 receiving an O-ring seal 60 which is adapted snugly to engage the shaft 28 to form an oil tight seal thereagainst. Mounted in the cage 46 is a ball bearing 64 which rolls on a bearing spacer 66 secured to the shaft 28. A bearing spacer seal 68 may be positioned between the spacer 66 and the end of the cage 46.

The shaft 28 is adapted to drive any suitable clutch mechanism (not shown but which may be such as that shown in Patent No. 2,285,639) and which is adapted to drive an output shaft or spindle 70 extending outwardly through the lower end of the clutch housing 72 within which the clutch mechanism is contained. The lower end of the motor housing 22 is formed with an annular step 74 over which the upper end of the clutch housing 72 is telescopically received. The side wall of the step is formed with a groove 76 in which is secured an O-ring 78 which provides an oil tight seal between the motor housing 22 and the clutch housing 72. A port 80 closed by a removable cap 82 may be provided for filling the clutch housing with oil.

Mounted in the lower end of the clutch housing is a bushing 84 within which the spindle 70 is adapted to revolve. An O-ring 86 is mounted in a recess 88 in the lower end of the bushing to form an oil tight seal about the spindle 70. The spindle 70 terminates in a wrench socket 90 which is suitably secured to the spindle.

It will be understood that the operation of the impact wrench of the invention is conventional. That is, to operate the wrench an operator manipulates the throttle lever to admit air to the air motor so as to drive the motor in the desired direction of rotation. In turn the motor will drive the clutch mechanism to impart rotation to the spindle 70 and thus the socket 90 so as to remove or drive home a nut engaged by the socket. When resistance to turning the nut is encountered, the clutch mechanism will operate to impact force to the spindle in the direction of the desired rotation of the nut so that it can be tightened or loosened as desired.

It has been found that the construction of the clutch housing with the sealing arrangement mounted directly in the end wall of the motor housing as illustrated enables the clutch housing to be oil filled rather than packed with grease. By the simple expedient of replacing the grease with oil the operating efficiency of the impact tool is greatly increased. Applicant has found that the torque output of the tool can be increased by five to ten percent while at the same time the volume of air consumed is very substantially decreased. A most important factor, particularly in areas of colder climate, is that the oil filled clutches operate efficiently in cold weather, whereas those having grease packed clutches tend to freeze-up and become virtually if not totally inoperative.

Having illustrated and described a preferred embodiment of the invention it should be apparent that it permits of modification in arrangement and detail. I claim all such modifications as come within the true spirit and scope of the appended claims.

I claim:

1. An impact tool comprising an impact clutch mechanism, a motor for driving said mechanism, said motor comprising a cylindrical housing and a rotor rotatably mounted within said housing coaxially thereof, said motor housing having an integral wall at one end thereof, a shaft connected to said rotor and extending through said wall, said wall having an opening concentric of said shaft defining a bearing race, a ball bearing mounted in said race and supporting said shaft, the outer surface of said wall having a groove therein defining an annular step about said opening, a cup shaped bearing cage seated in said groove, a sealing means positioned between the side wall of said cage and the side wall of said step providing an oil tight seal, said cage having a bottom wall extending at right angles to the axis of said shaft and having an opening for receiving said shaft, sealing means positioned between said shaft and said cage providing an oil tight seal therebetween, a tubular housing enclosing said clutch mechanism, said clutch housing including a mounting portion telescopically surrounding said one end of said housing, means operatively arranged between said clutch housing and said motor housing to provide an air and oil tight seal therebetween, said clutch mechanism having an output shaft extending outwardly of said clutch housing, and means to provide an oil tight seal between said output shaft and said clutch housing, said clutch housing being oil filled.

2. An impact tool comprising an impact clutch mechanism, a motor for driving said mechanism, said motor comprising a cylindrical housing and a rotor rotatably mounted with said housing coaxially thereof, said motor housing having a wall at one end thereof, a shaft connected to said rotor and extending through said wall, said wall having an opening concentric of said shaft defining a bearing race, a ball bearing mounted in said race and supporting said shaft, the outer surface of said wall having a groove therein defining an annular step about said opening, a cup-shaped bearing cage mounted in said groove, an O-ring seal positioned between the side wall of said cage and the side wall of said step, said cage having a bottom wall extending at right angles to the axis of said shaft and having an opening for receiving said shaft, an O-ring positioned in the surface defining said last mentioned opening in snug engagement with said shaft so as to provide a seal therebetween, a tubular housing enclosing said clutch mechanism, said clutch housing including a mounting portion telescopically surrounding said one end of said housing, means operatively arranged between said clutch housing and said motor housing to provide an air and oil tight seal therebetween, said mechanism having an output shaft extending outwardly of said clutch housing, and means to provide an oil tight seal between said output shaft and said clutch housing, said clutch housing being oil filled.

References Cited in the file of this patent
UNITED STATES PATENTS

| | | |
|---|---|---|
| 2,219,869 | Hutchinson | Oct. 29, 1940 |
| 2,825,436 | Amtsberg | Mar. 4, 1958 |
| 2,928,504 | Hahn et al. | Mar. 15, 1960 |